United States Patent
Murata

(10) Patent No.: US 8,326,071 B2
(45) Date of Patent: Dec. 4, 2012

(54) IMAGE PROCESSING METHOD TO RESTORE AN IMAGE

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 537 days.

(21) Appl. No.: 12/452,286

(22) PCT Filed: Aug. 25, 2008

(86) PCT No.: PCT/JP2008/002297
§ 371 (c)(1), (2), (4) Date: Dec. 23, 2009

(87) PCT Pub. No.: WO2009/034688
PCT Pub. Date: Mar. 19, 2009

(65) Prior Publication Data
US 2010/0104208 A1   Apr. 29, 2010

(30) Foreign Application Priority Data

Sep. 10, 2007 (JP) ................................. 2007-234556
Sep. 10, 2007 (JP) ................................. 2007-234557

(51) Int. Cl.
*G06K 9/40* (2006.01)
(52) U.S. Cl. ........................ 382/255; 382/254
(58) Field of Classification Search .......... 382/254, 382/255, 275; 250/201.2, 201.8; 348/345, 348/357; 355/55, 63; 396/89
See application file for complete search history.

(56) References Cited

U.S. PATENT DOCUMENTS

| 7,379,612 B2 * | 5/2008 | Milanfar et al. ............... 382/254 |
| 7,477,802 B2 * | 1/2009 | Milanfar et al. ............... 382/299 |
| 2008/0175509 A1 * | 7/2008 | Wheeler et al. ............... 382/260 |

FOREIGN PATENT DOCUMENTS

| JP | A-7-55905 | 3/1995 |
| JP | A-2007-143851 | 6/2007 |

OTHER PUBLICATIONS

Chantas et al.; "Bayesian Restoration Using a New Nonstationary Edge-Preserving Image Prior;" *IEEE Transactions on Image Processing*; 2006; pp. 2987-2997; vol. 15; No. 10.

(Continued)

*Primary Examiner* — Bhavesh Mehta
*Assistant Examiner* — Edward Park
(74) *Attorney, Agent, or Firm* — Oliff & Berridge, PLC

(57) ABSTRACT

The present application provides an image processing method of obtaining a clear image from a blurred image which includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a gradient vector of the cost function; and obtaining, by using the gradient vector being calculated, image data of the clear image by a numerical optimization method which calculates the image data of the clear image by using only the gradient vector such that a value of the cost function becomes maximum or minimum.

6 Claims, 4 Drawing Sheets

OTHER PUBLICATIONS

Fujita et al.; "Stochastic Model-based Parameter Estimation and Restoration of Non-uniformly Blurred Images;" *The Journal of the Institute of Image Information and Television Engineers*; 2001; pp. 878-885; vol. 55; No. 6. (w/ partial trans).

Fujimoto et al.; "Restoration from Multi-Frame Blurred Images Based on Stochastic Image Models;" *The Transactions of the Institute of Electronics, Information and Communication Engineers*; 1999; pp. 863-871; vol. J82-D-2; No. 5. (w/ partial trans).

Pan et al.; "Efficient Huber-Markov Edge-Preserving Image Restoration;" *IEEE Transactions on Image Processing*; 2006; pp. 3728-3735; vol. 15; No. 12.

Yabuki et al.; "Bayesian Restoration Methods of Defocusing Images Using a Genetic Algorithm;" *The Institute of Electronics, Information and Communication Engineers Technical Report*; 1997; pp. 143-150; vol. 97; No. 40. (w/ abstract).

International Search Report for International Application No. PCT/JP2008/002297, issued Sep. 22, 2008.

International Preliminary Report on Patentability issued in International Application No. PCT/JP2008/002297 on Mar. 30, 2010 (with translation).

\* cited by examiner

PIXEL OF BLURRED IMAGE g
ADDED PIXEL

IMAGE PROCESSING METHOD TO RESTORE AN IMAGE

CROSS-REFERENCE TO RELATED APPLICATION

This application is a U.S. National Stage application claiming the benefit of prior filed International Application No. PCT/JP2008/002297, filed Aug. 25, 2008, in which the International Application claims a priority date of Sep. 10, 2007 based on prior filed Japanese Application No. 2007-234556 and Japanese Application No. 2007-234557, the entire contents of which are incorporated herein by reference.

TECHNICAL FIELD

The present application relates to an image processing method and program for restoring a clear image from a blurred image or increasing the resolution of a low resolution image.

BACKGROUND ART

Conventionally, in order to restore a blurred image having been caused, for example, when the imaging lens of an imaging device, such as a camera, has become out of focus, a method is used that extracts the edge components from the blurred image and adds the edge components to the original blurred image while changing the ratio to perform edge enhancement, thereby making the image clear.

Further, in recent years, methods have been actively developed that restore an image, based on a statistic theory called Bayes Theory. Non-patent Document 1 discloses a manner of restore processing of an image, the manner using a quasi-Newton method with assumption that the original clear image of a blurred image is one that minimizes the cost function calculated based on Bayes Theory. Non-patent Document 2 discloses a manner of restoring an image in calculating the cost function, wherein the manner employs a minimization technique by the use of a Sherman-Morris matrix instead of the quasi-Newton method referred to in Non-patent Document 1, so as to restore the image in a shorter time than the manner by Non-patent Document 1.

[Non-patent Document 1] G. K. Chantas, N. P. Galatsanos, and A. C. Likas, 'Bayesian Restoration Using a New Nonstationary Edge-Preserving Image Prior', IEEE Transactions on Image Processing, Vol. 15, No. 10, pp. 2987-2997, 2006

[Non-patent Document 2] R. Pan and S. J. Reeves, 'Efficient Huber-Markov Edge-Preserving Image Restoration', IEEE Transactions on Image Processing, Vol. 15, No. 12, pp. 3728-3735, 2006.

DISCLOSURE

Problems to be Solved

However, the manner, being a conventional art, of restoring by adding the edge components of an image to the original blurred image while changing the ratio, though taking a short processing time, is not applicable to an image with a significant degree of blurring. On the other hand, the image restoring methods by Non-patent Document 1 and Non-patent Document 2 require performing matrix operation in a huge size in the restore processing, which causes an increase in the amount of memory and an extremely long processing time. Further, increase in the number of pixels of the imaging sensor of an electronic camera or the like in the recent years does not allow restore processing without dividing an image into blocks because of short of memory capacity. However, this block dividing generates errors (linking) in pixel values at the boundaries of respective blocks, which may make the discontinuity of the image noticeable.

Further, when performing processing by a single method of a conjugate gradient method or steepest descent method, it may occur that image processing does not converge and an optimization solution cannot be found.

Addressing the problems with the above-described conventional art, a proposition of the present application is to provide a technology that performs image processing at a high speed in a small amount of memory without performing block dividing in image processing of restoring a blurred image or increasing the resolution of a low resolution image. Another proposition of the present invention is to provide a technology of image processing of restoring a blurred image or improving the resolution of a low resolution image, avoiding matrix operation and using plural numerical optimization methods.

Means for Solving the Problems

An image processing method in accordance with a first embodiment includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a gradient vector of the cost function; and obtaining, by using the gradient vector being calculated, image data of the clear image by a numerical optimization method which calculates the image data of the clear image by using only the gradient vector such that a value of the cost function becomes maximum or minimum.

An image processing method in accordance with a second embodiment includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a first gradient vector of the cost function; updating, by using the first gradient vector being calculated, image data of the clear image by a first numerical optimization method or a second numerical optimization method which calculates the image data of the clear image by using only a gradient vector such that a value of the cost function becomes maximum or minimum; calculating a second gradient vector of the cost function obtained from the image data of the clear image being updated; and selecting the first numerical optimization method or the second numerical optimization method according to a comparison of a value of a ratio with a predetermined value, the ratio being between a size of the first gradient vector and a size of the second gradient vector.

An image processing method in accordance with a third embodiment includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a first gradient vector of the cost function; updating, by using the first gradient vector being calculated, image data of the clear image by a first numerical optimization method or a second numerical optimization method which calculates the image data of the clear image by using only a gradient vector such that a value of the cost function becomes maximum or minimum; calculating a second gradient vector of the cost function obtained from the image data of the clear image being updated; and selecting the first numerical optimization method or the second numerical optimization method according to a comparison of a value of a ratio with a predetermined value, the ratio being between a maximum value of components of the first gradient vector and a maximum value of components of the second gradient vector.

An image processing method in accordance with a fourth embodiment includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a first gradient vector of the cost function; updating, by using the first gradient vector being calculated, image data of the clear image by a first numerical optimization method or a second numerical optimization method which calculates the image data of the clear image by using only a gradient vector such that a value of the cost function becomes maximum or minimum; calculating a second gradient vector of the cost function obtained from the image data of the clear image being updated; and selecting the first numerical optimization method or the second numerical optimization method according to a comparison of a value of a ratio with a predetermined value, the ratio being between a size of the first gradient vector and a size of the second gradient vector in which the second numerical optimization method adjusts the second gradient vector using the first gradient vector.

An image processing method in accordance with a fifth embodiment includes the steps of converting an array of image data from a two dimension into a one-dimensional vector, the image data storing pixel values of the blurred image; converting all of two-dimensional matrix operations acting on the one-dimensional vector into an image filtering for the image data of the blurred image, and calculating values of statistic parameters necessary for calculation of a cost function estimating the clear image and a first gradient vector of the cost function; updating, by using the first gradient vector being calculated, image data of the clear image by a first numerical optimization method or a second numerical optimization method which calculates the image data of the clear image by using only a gradient vector such that a value of the cost function becomes maximum or minimum; calculating a second gradient vector of the cost function obtained from updated image data of the clear image being updated; and selecting the first numerical optimization method or the second numerical optimization method according to a comparison of a value of a ratio with a predetermined value, the ratio being between a maximum value of components of the first gradient vector and a maximum value of components of the second gradient vector in which the second numerical optimization method adjusts the second gradient vector using the first gradient vector.

Effects

In accordance with the present embodiment, image processing can be performed at a high speed in a small amount of memory without performing block dividing in image processing of restoring a blurred image or increasing the resolution of a low resolution image. Further, according to the present embodiment, image processing can be performed to restore a blurred image or improve the resolution of a low resolution image, avoiding matrix operation and using plural numerical optimization methods.

DETAILED DESCRIPTION OF THE EMBODIMENTS

<<Description of One Embodiment>>

Figure 1:
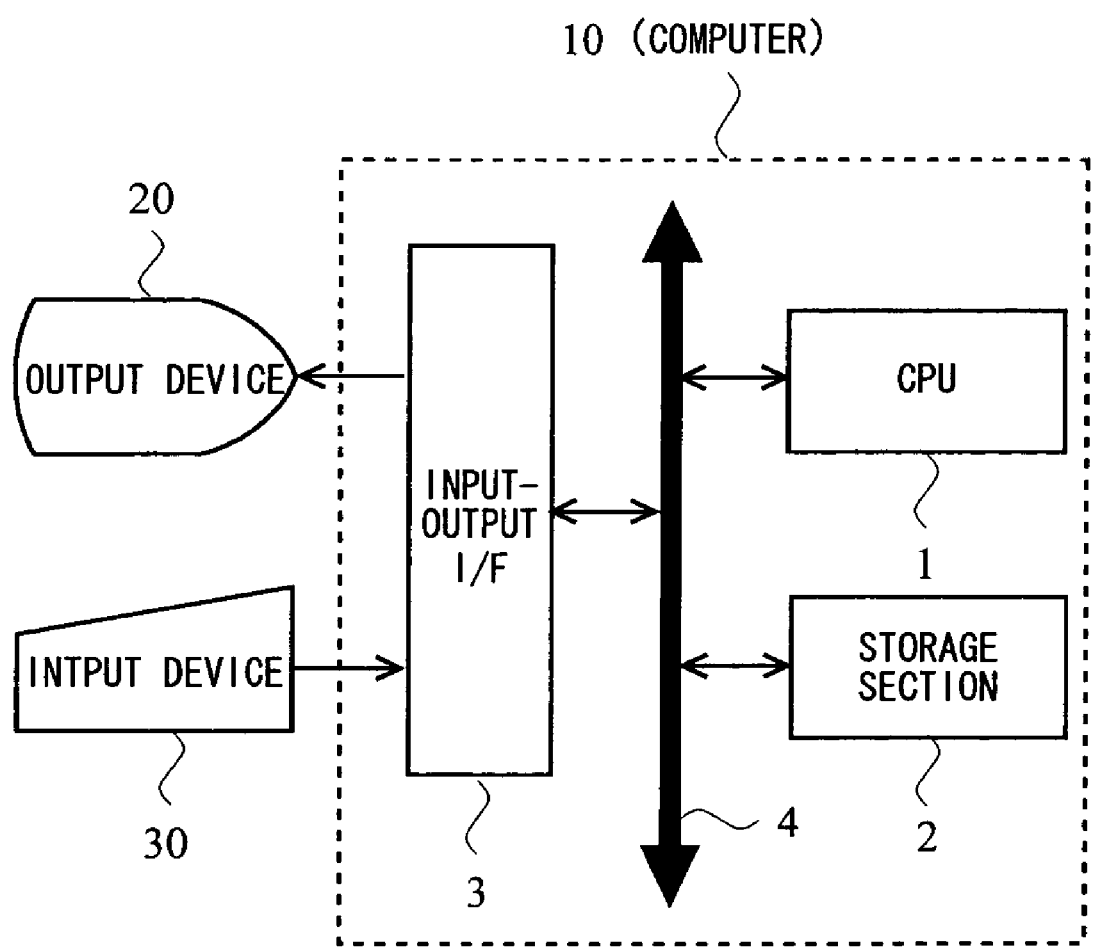
FIG. 1 is a conceptual diagram where an image processing method in accordance with one embodiment of the present embodiment is applied to a computer 10.

FIG. 1 is a conceptual diagram where an image processing method in accordance with one embodiment of the present invention is applied to a computer 10.

The computer 10 shown in FIG. 1 includes a CPU 1, storage section 2, input-output interface (input-output I/F) 3, and bus 4, wherein the CPU 1, storage section 2, and input-output section I/F 3 are coupled with each other via the bus 4 where information is transmittable. Further, via the input-output I/F 3, the computer 10 is coupled respectively with an output device 20 that displays a mid-term process and processing result of image processing and with an input device 30 that receives input from a user. As the output device 20, a common liquid crystal monitor, printer, and the like can be employed. As the input device 30, a keyboard, mouse, and the like can be selected as necessary to be used.

Based on an instruction received by the input device 30 from the user, the CPU 1 reads an image restore program stored in the storage section 2, and performs restore processing of an image stored in the storage section 2. The CPU 1 displays a result of restore processing of the image on the output device 20. As the CPU 1, a common central processing unit can be used.

The storage section 2 records, not only the data of a picked-up image of a subject, but also the image restore program and the like for restore processing of the image degradation of the image correspondingly to objects being subjects or imaging conditions. Further, the storage section 2 stores a parameter table that lists the values of parameters required in the restore processing, described later, the values corresponding respectively to the objects being the subjects and imaging conditions. The CPU 1 can refer to the image data, program, table, and the like stored in the storage section 2 via the bus 4, as necessary. As the storage section 2, a storage device, such as a common hard disk device, magneto-optical disk device, or the like, can be selected to be used. Although the storage section 2, shown in FIG. 1, is incorporated in the computer 10, an external storage device may be used, wherein the storage section 2 is coupled with the computer 10 via the input-output I/F 3.

Figure 2:
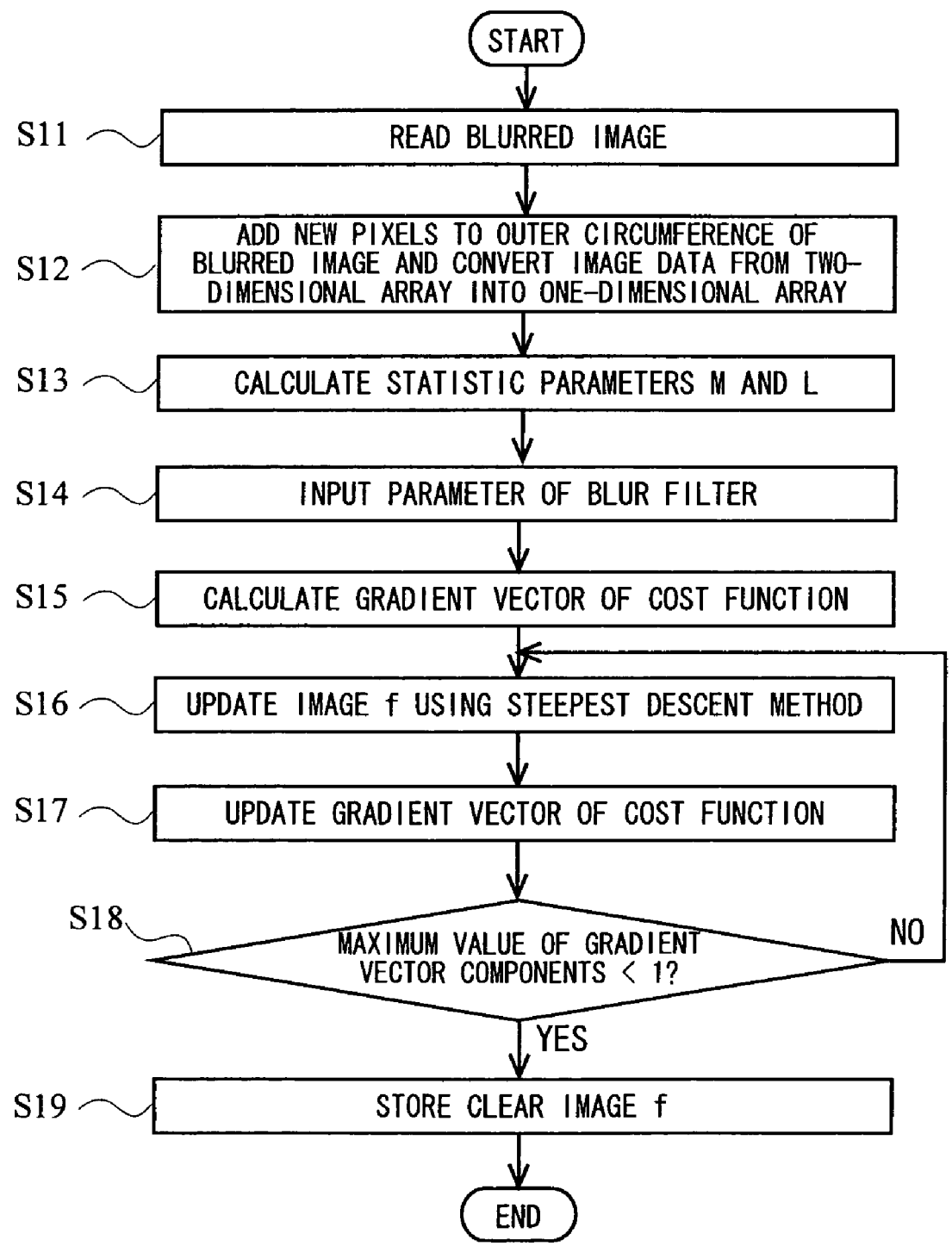
FIG. 2 is a flowchart showing a procedure in image processing in accordance with the one embodiment of the present embodiment.

FIG. 2 shows the overall flow of the image processing method in accordance with the one embodiment of the present invention, where the computer 10 is used. The processing in the present embodiment will be described below, referring to the flow shown in FIG. 2.

The user uses the input device 30 to input a command of the image processing program or double clicks an icon of the program to issue a command to start the program. The CPU 1 receives the command via the input-output I/F 3, and executes the image restore program stored in the storage section 2. As a result, processing starting in step S11, shown in FIG. 2, is performed. In the present embodiment, it is assumed that a blurred image of a subject, the subject being an object of restore processing, picked-up by an electronic camera or the like is stored in the storage section 2 in advance. Herein, a blurred image refers to, for example, an image or the like that has been caused, for example, when the imaging lens of an electronic camera or the like has become out of focus.

In step S11, a blurred image to be restored into a clears image is read.

Figure 3:
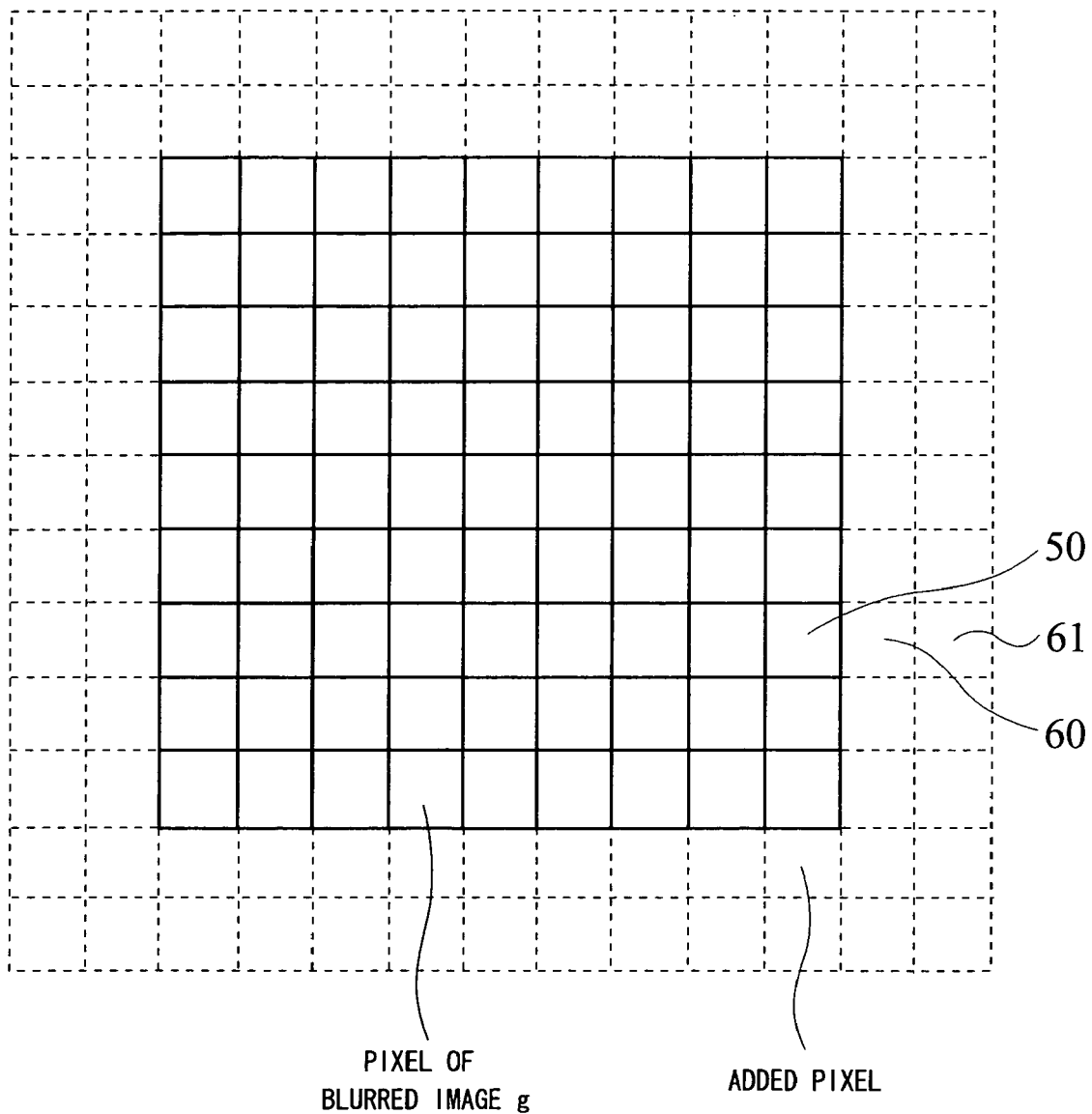
FIG. 3 is a diagram showing a procedure of adding new pixels to the outer circumference of a blurred image g.

In step S12, as shown in FIG. 3, pixels (dashed lines) are newly added to the outer circumference of the pixels of the blurred image g. The newly added pixels, pixels 60 and 61 for example, are given with the same pixel value as that of the adjacent pixel 50 of the image. Then, the blurred image data is converted from a matrix of a two-dimensional array into a vector type of a one-dimensional array.

Herein, pixels are newly added to the circumference of pixels of the blurred image g because, if the blur filter is centrally symmetrical, a blur filter matrix H in later-described Equation (1) and the transposed matrix $H^T$ thereof can be handled to be approximately the same as each other, which makes the operation described below easy. That is, even when the blur filter is centrally symmetrical, the blur filter matrix H and the transposed matrix $H^T$ are generally not the same. This is because, when the blur filter is centrally symmetrical, the periphery of an outer circumferential pixel 50, for example, of the blurred image g includes a part where no adjacent pixel is present, as shown in FIG. 3 and, accordingly, the pixel 50 on the outer circumference of the pixels of the blurred g and pixels in other regions are handled differently. When the blur filter is not centrally symmetric, it is not only because of the difference due to the effects by H and $H^T$ edge processing. In this situation, by adding pixels 60 and 61, as shown in FIG. 3, having the same pixel value as that of the pixel 50 on the outer circumference of pixels of the blurred image g, the difference, in handling pixels, between the pixel 50 on the outer circumference of the pixels of the blurred image g and pixels in other regions is eliminated. Thus, when the blur filter is centrally symmetric, handling with an assumption that the blur filter matrix H and the transposed matrix $H^T$ are the same affects the process results little. The width formed by newly added pixels can be arbitrarily determined. Although, in FIG. 3, a width of two pixels is added, the width can be changed as necessary corresponding to the situation. In the present embodiment, the width formed by added pixels is greater than the filter radius.

Next, before proceeding to step S13, it will be briefly described about Bayes statistics, a probability model, steepest descent method, and cost function.

Representing the original clear image by f for a blurred image g expressed by a one-dimensional vector, the original clear image being expressed by a one-dimensional vector likewise, there is a relationship between these images as the following Equation (1).

Equation (1)

$$g = Hf + n \quad (1)$$

wherein "n" in Equation (1) represents white noises, which are one of the causes of degradation of an image expressed by a one-dimensional vector.

On the other hand, Bayes statistics refers to a relationship where, for example, regarding two events A and B, the probability that event B occurs when event A has occurred is represented by the following Equation (2) using the probability that event A occurs when event B has occurred.

Equation (2)

$$P(B \mid A) = \frac{P(B)P(A \mid B)}{P(A)} \quad (2)$$

By Equation (2), obtaining a clear image f from the blurred image g in the present embodiment can be expressed using the probability that, when a clear image f is present, the clear image f becomes the blurred image g. Such a probability is represented by the following Equation (3), based on Bayes statistics and the model described in Non-patent Document 1.

Equation (3)

$$P(f, a \mid g; \beta, m, l) = \frac{P(f; a)P(a; m, l)P(g \mid f, a; \beta)}{P(g; \beta, m, l)} \propto \quad (3)$$

$$P(f; a)P(a; m, l)P(g \mid f, a; \beta)$$

$$= P(g, f, a; \beta, m, l)$$

wherein β in Equation (3) is an inverse of dispersion with an assumption that the distribution of white noises n is a Gauss distribution, and "a" represents a matrix with respect to the dispersion of the edger components of the image f, wherein the matrix includes components in the vertical, horizontal, inclined 45 degrees, and inclined 135 degrees directions of the image. Statistic parameters "m" and "l" can be estimated using the average and dispersion of the diagonal components of the matrix "a" and are vectors having components in the four directions. Equation (3) is called a probability model. An image f that maximizes Equation (3) of the probability model is the clear image f, to be obtained, of the present model. However, in the present embodiment, instead of obtaining a clear image f that maximizes Equation (3), a clear image f that minimizes the value of a cost function $J_B$ (g, f; β, m, l)=−ln P(g, f; β, m, l) is obtained. The cost function $J_B$ in the present embodiment is concretely represented by the following Equation (4) based on the model described in Non-patent Document 1.

Equation (4)

$$J_B(g, f, a; \beta, m, l) = \frac{5N}{2}\ln(2\pi) - \frac{N}{2}\ln(\beta) + \frac{\beta}{2}\|Hf - g\|^2 - \quad (4)$$

$$N\sum_{k=1}^{4}\left(\frac{l_k}{2}\ln(m_k(l_k - 1)) + \ln\Gamma\left(\frac{l_k}{2} + \frac{1}{2}\right) - \ln\Gamma\left(\frac{l_k}{2}\right)\right) +$$

$$\sum_{k=1}^{4}\left(\frac{l_k}{2} + \frac{1}{2}\right)\sum_{i=1}^{N}\ln\left(m_k(l_k - 2) + \frac{1}{2}(Q^k f)_i^2\right)$$

wherein N in Equation (4) represents the number of pixels of the image, and the suffixes "k" of the statistic parameters "m" and "l" represent estimation using the averages and dispersions of the diagonal components of the matrix "a" in the respective directions of the vertical (k=1), horizontal (k=2), oblique 45 degrees (k=3), and oblique 135 degrees (k=4) directions of the image. Qk represent the operators of the two-dimensional matrix for obtaining the edge components of the image in the respective directions.

In the present embodiment, in order to obtain a clear image f that minimizes the cost function $J_B$, a steepest descent method, which does not need matrix operation in the internal processing, is used instead of a quasi-Newton method accompanied by matrix operation used in Non-patent Document 1. In the steepest descent method, as the search direction for the optimization solution, the direction of the gradient of the cost function $J_B$ is set, and the optimization solution is obtained while adjusting the gradient amount with a parameter μ. The steepest descent method can be represented by Equation (5).

Equation (5)

$$f_{i+1} = f_i - \mu \nabla J_B(f_i) \quad (5)$$

A position where the gradient of the cost function $J_B$ is zero, in other words, a clear image f, with which the cost function takes the extremum value, is the one to be obtained. The gradient of the cost function $J_B$ can be represented by Equation (6) when represented in a vector form based on Equation (4).

Equation (6)

$$\frac{\partial J_B(f)}{\partial f_i} = \beta H_{ja}^T (H_{\alpha\gamma} f_\gamma - g_\alpha) + \sum_{k=1}^{4} \left(\frac{l_k}{2} + \frac{1}{2}\right)(Q_k^T)_{ja} v_\alpha^k \quad (6)$$

wherein $v_i^k$ is represented by Equation (7).

The suffixes α and γ of Greek letters in Equations (6) and (7) represent summing up for a range from 1 to N.

Equation (7)

$$v_i^k = \frac{Q_{ia}^k f_\alpha}{m_k(l_k - 2) + (Q_{i\gamma}^k f_\gamma)^2 / 2} \quad (7)$$

In step S13, the statistic parameters "m" and "l", which are necessary for calculation of $J_B$, are obtained, having "f" and "g" be f=g. Normally, these values are to be calculated from the clear image f. However, because the clear image f is not yet known in the current step, and because experience shows that there is no significant difference between a result with a parameter value calculated from the blurred image g and that with a value calculated from a clear image f that is finally obtained, parameter calculation is carried out having f and g be f=g.

In step S14, in the present embodiment, in order to perform restore processing with an assumption that the blur filter in Equation (1) is an extended Gauss type filter $G_0 \exp(-(r/\sigma)^\delta)$, an input of the value of the parameter σ of this filter is received from the user. The value of δ can be arbitrarily determined, and is set to δ=0.5 in the present embodiment.

In step S15, calculations in accordance with Equations (6) and (7) are performed, using the values of the parameters obtained in steps S13 and S14 to calculate the gradient vector of the cost function $J_B$. Herein, Equations (6) and (7) include terms of matrix operation of Hf, $Q^k f$, and $Q^T_k v^k$. However, Hf and $Q^k f$ are matrix operations for smoothing and extraction of edge components, and further, $Q^T_k$ can function as an extraction filter of edge components likewise. That is, it is possible to replace the matrix operation of Hf, $Q^k f$, and $Q^T_k v^k$ by filtering processing of smoothing and extraction of edge components. Thus, a combination with the processing in step S12, with an assumption that the blur filter matrix H and the transposed matrix $H^T$ thereof are the same, allows processing without directly performing matrix operation in calculating the gradient vector, and the gradient vector of the cost function $J_B$ can be calculated in a small memory area at a high speed.

In step S16, using the gradient vector, of the cost function $J_B$, obtained in step S15 and Equation (5), the clear image f is updated to a newly calculated clear image f' (f=f'). As has been described, in step S16, by using optimization without matrix operation, it is possible not to use matrix operation in any processing. In the present embodiment, the parameter for adjusting the gradient amount is set equal to the dispersion $\beta^{-1}$ of the white noise n.

In step S17, using the clear image f updated in step S16, the gradient vector of a new cost function $J_B$ is obtained.

In step S18, it is determined whether the maximum value of the component in the gradient vector of the cost function $J_B$ obtained in step S17 is smaller than 1 or not. If the component is smaller than 1, then the process proceeds to step S19 (YES side) with determination that the blurred image processing by the steepest descent method has converged. On the other hand, if the component is greater than or equal to 1, then the process returns to step S16 (NO side) with determination that the image processing has not yet converged, and performs the processing from step S16 to the step S18 until the maximum value of the gradient vector component of the cost function $J_B$ becomes smaller than 1 to obtain a clear image f.

In step S19, the obtained clear image f is converted from a one-dimensional array into a data type of a two-dimensional array, and the pixels added in step S12 are removed from the clear image f. The remaining is the original clear image f of the blurred image g and is stored, and then the image processing is terminated.

As has been described, in the present embodiment, matrix operation in the gradient vector calculation of the cost function $J_B$ is replaced by filtering processing of smoothing and extraction of edge components, and a steepest descent method requiring no matrix operation is used, so as to obtain a clear image f. Thus, it is possible to realize a significant reduction in the amount of memory and operation processing at a high speed. Further, the circuit scale of the processing device can be downsized.

Further, in the present embodiment, by avoiding matrix operation, the necessity of performing block dividing of an image having been performed in a conventional art is eliminated even for restore processing of an image having a huge number of pixels. In such a manner, it is possible to avoid discontinuity (linking), of an image, generated at the boundaries of respective blocks.

<<Description of Another Embodiment>>

Figure 4:
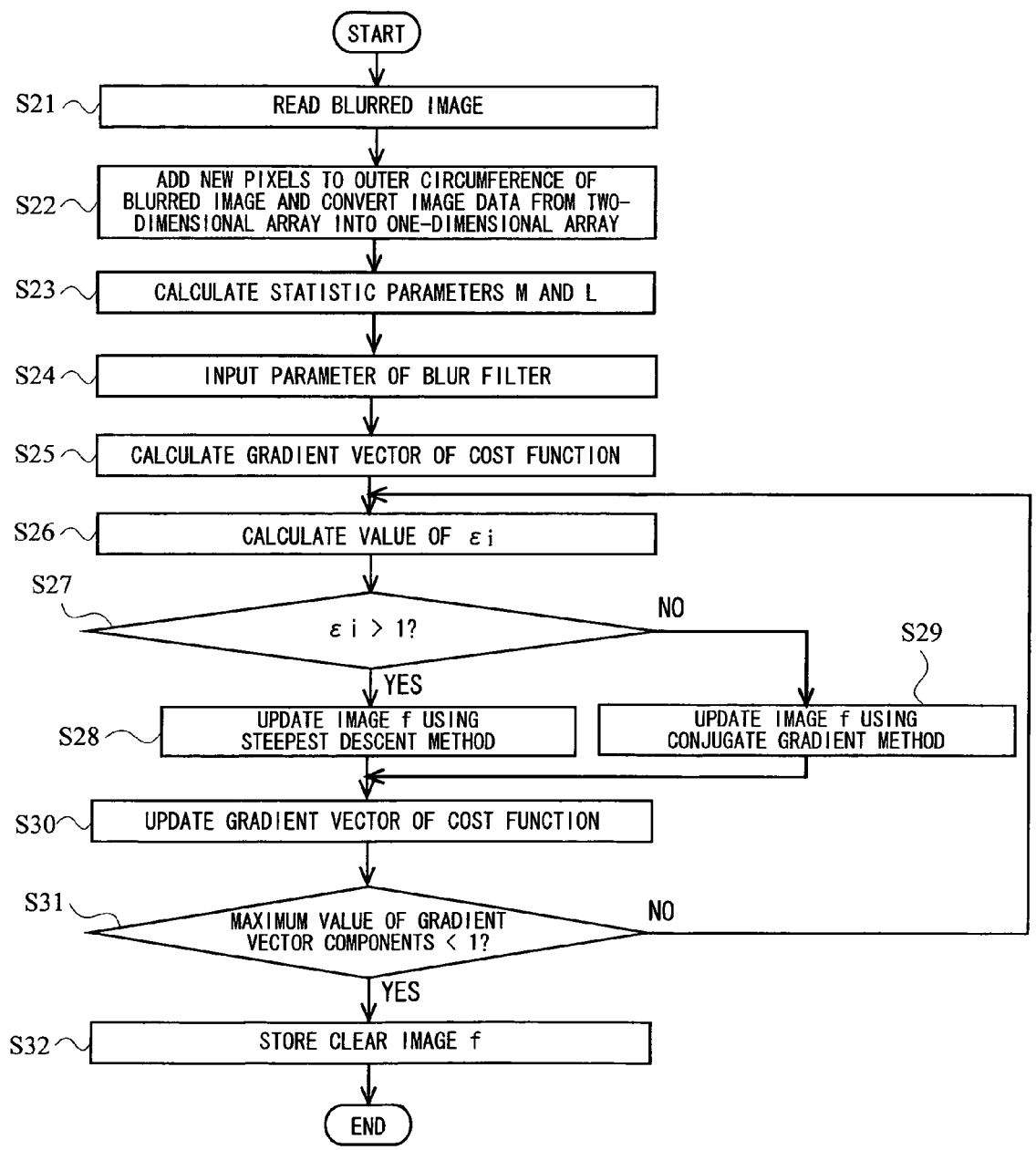
FIG. 4 is a flowchart showing a procedure in image processing in accordance with another embodiment of the present embodiment.

An image processing method in accordance with another embodiment of the present invention, where the computer 10 shown in FIG. 1 is used likewise will be described below, according to the flow shown in FIG. 4.

First, using the input device 30, the user inputs a command of an image processing program or double clicks the icon of the program to issue an instruction to start the program. The CPU 1 receives the instruction via the input-output I/F 3, and executes an image restore program stored in the storage section 2. As a result, processing from step S21 in FIG. 4 is performed. Also in the present embodiment, it is assumed that a blurred image of a subject, the subject being an object of restore processing, picked-up by an electronic camera or the like is stored in the storage section 2 in advance. Herein, a blurred image refers to, for example, an image or the like that has been caused, for example, when the imaging lens of an electronic camera or the like has become out of focus.

In step S21, the blurred image desired to be restored into a clear image is read.

In step S22, similarly to the one embodiment, as shown in FIG. 3, pixels (dashed lines) are newly added to the outer circumference of the pixels of the blurred image g. The newly added pixels, pixels 60 and 61 for example, are given with the same pixel value as that of the adjacent pixel 50 of the image. Then, the blurred image data is converted from a matrix of a two-dimensional array into a vector type of one-dimensional array. The width of newly added pixels can be arbitrarily determined. Although, in FIG. 3, a width of two pixels is added, the width can be changed, as necessary, corresponding to the situation. In the present embodiment, the width formed by pixels is added to be greater than the filter radius.

Next, before proceeding to step S23, it will be briefly described about a conjugate gradient method. Similarly to the description in the one embodiment, in the present embodiment, in order to obtain a clear image f that minimizes the cost function $J_B$, a steepest descent method, which does not execute matrix operation in the internal processing, is used instead of a quasi-Newton method accompanied by matrix operation used in Non-patent Document 1, and a conjugate gradient method is used. A conjugate gradient method is a method that obtains the optimization solution by determining the search direction $d_i$, at the current position (i), for obtaining the optimization solution, taking into account the gradient direction of the cost function $J_B$ at the current position and the search direction $d_{i-1}$ at the previous position (i−1). The conjugate gradient method is represented by Equation (8).

Equation (8)

$$d_i = \nabla J_B(f_i) + \epsilon_i d_{i-1} \quad (8)$$

wherein "$\epsilon_i$" in Equation (8) is a value determined by the following Equation (9), and is represented by the ratio between the absolute values of the gradient of the cost function $J_B$ at the current position (i) and that at the previous position (i−1).

Equation (9)

$$\varepsilon_i = \frac{|\nabla J_B(f_i)|^2}{|\nabla J_B(f_{i-1})|^2} \quad (9)$$

Since, in comparison with the steepest descent method, this method employs the gradient direction of the cost function $J_B$ as the search direction $d_i$, for obtaining the optimization solution and obtains the optimization solution while adjusting the gradient amount with the parameter μ, Equation (5) becomes the following Equation (10).

Equation (10)

$$f_{i+1} = f_i - \mu d_i \quad (10)$$

No matter which of the methods is used, a position where the gradient of the cost function $J_B$ is zero, in other words, a clear image f, with which the cost function takes the extremum value, is the one to be obtained. In the present embodiment, judgment as to which alternative numerical optimization method is to be used is determined by the size of the value of $\epsilon_i$. That is, when $\epsilon_i \leq 1$, namely, when $|\nabla J_B(f_i)| \leq |\nabla J_B(f_{i-1})|$, in other word, the gradient of the cost function $J_B$ decreases, the conjugate gradient method is to be used. On the other hand, when $\epsilon_i > 1$, namely, when $|\nabla J_B(f_i)| > |\nabla J_B(f_{i-1})|$, in other word, the gradient of the cost function $J_B$ increases, the steepest descent method is to be used.

In step S23, the statistic parameters "m" and "l", which are necessary for calculation of $J_B$, are obtained, having "f" and "g" be f=g. Normally, these values are to be calculated from a clear image f. However, because the clear image f is not yet known in the current step, and because experience shows that there is no significant difference between a result with a parameter value calculated from the blurred image g and that with a value calculated from a clear image f that is finally obtained, parameter calculation is carried out having "f" and "g" be f=g.

In step S24, in the present embodiment, in order to perform restore processing with an assumption that the blur filter in Equation (1) is an enhanced Gauss type filter $G_0 \exp(-(r/\sigma)^\delta)$, an input of the value of the parameter σ of this filter is received from the user. The value of δ can be arbitrarily determined, and is set to δ=0.5 in the present embodiment.

In step S25, calculations in accordance with Equations (6) and (7) are performed, using the values of the parameters obtained in steps S23 and S24, so as to obtain the gradient vector of the cost function $J_B$. Herein, Equations (6) and (7) include terms of matrix operations of Hf, $Q^k f$, and $Q^T_k v^k$. However, Hf and $Q^k f$ are matrix operations for smoothing and extraction of edge components, and further, $Q^T_k$ can function as an extraction filter of edge components likewise. That is, it is possible to replace the matrix operations of Hf, $Q^k f$, and $Q^T_k v^k$ by filtering processing of smoothing and extraction of edge components. Thus, a combination with the processing in step S22, with an assumption that the blur filter matrix H and the transposed matrix $H^T$ thereof are the same, allows processing without directly performing matrix operation in calculating the gradient vector, and the gradient vector of the cost function $J_B$ can be calculated in a small memory area at a high speed.

In step S26, $\epsilon_i$ of Equation (9) is calculated to determine which one of the conjugate gradient method and steepest descent method is to be used as the numerical optimization method. The process proceeds to step S27. However, when the process has proceeded to this step S26 immediately after a start of the processing, $\epsilon_i$ cannot be calculated because the search direction $d_{i-1}$ at the previous position (i−1) is unknown. In the present embodiment, the processing in steps S26 and S27 is skipped at the time immediately after a start of processing, and the process proceeds directly to step S29.

In step S27, it is determined whether the value of $\epsilon_i$ obtained in step S26 is greater than or equal to 1, in other words, whether the image processing is going to the direction of convergence. If $\epsilon_i > 1$, then the process proceeds to step S28 (YES side). If $\epsilon_i \leq 1$, then the process proceeds to step S29 (NO side). However, as described above, when the process is immediately after a start of the processing, the processing in this step S27 is skipped and the process proceeds directly to step S29.

In step S28, using the gradient vector of the cost function $J_B$ obtained in step S25 and the steepest descent method having $\epsilon_i = 0$ in Equation (10), the clear image f is updated to a newly calculated clear image f' (f=f'). As described above, by using the optimization accompanied by no matrix operation in the processing in step S28, the necessity of matrix operation is eliminated in any processing. In the present embodiment, the parameter μ for adjustment of the gradient is set equal to the dispersion $\beta^{-1}$ of the white noise n.

In step S29, using the gradient vector of the cost function $J_B$ obtained in step S25 and the conjugate gradient method in Equation (8), the clear image f obtained by Equation (10) is updated to a newly calculated clear image f" (f=f"). Similarly to step S28, by using the optimization accompanied by no matrix operation, the necessity of matrix operation is eliminated in any processing.

In step S30, using the clear image f updated in step S28 or S29, the gradient vector of the cost function $J_B$ is obtained.

In step S31, it is determined whether the maximum value of the component in the gradient vector of the cost function $J_B$ obtained in step S27 is smaller than 1 or not. If the component is smaller than 1, then it is determined that the blur image processing by the steepest descent method has converged, and the process proceeds to step S32 (YES sire). On the other hand, if the component is greater than or equal to 1, then it is determined that the image processing has not yet converged, the process returns to step S26 (NO side), and the processing from step S26 to S31 is performed until the maximum value of the components of the gradient vector of the cost function $J_B$ becomes smaller than 1 so as to obtain a clear image f.

In step S32, the obtained clear image f is converted from the vector of a one-dimensional array into a data type of a two-dimensional array. The pixels added in step S22 are removed from the clear image f. The remaining is the original clear image f of the blurred image g and is stored, and then the image processing is terminated.

As has been described, in the present embodiment, matrix operation in the gradient vector calculation of the cost function $J_B$ is replaced by filtering processing of smoothing and extraction of edge components, and a conjugate gradient method or steepest descent method requiring no matrix operation is used, to obtain a clear image f. Thus, it is possible to realize a significant reduction in the amount of memory and operation processing at a high speed. Further, the circuit scale of the processing device can be downsized.

Further, in the present embodiment, by avoiding matrix operation, the necessity of performing block dividing of an image having been performed in a conventional art is eliminated even for restore processing of an image having a huge number of pixels. In such a manner, it is possible to avoid discontinuity (linking), of an image, generated at the boundaries of respective blocks.

Still further, in the present embodiment, by switching and using the conjugate gradient method and steepest descent method as necessary, an optimization solution can be surely found, which allows restoring a blurred image to a clear image.

<<Supplement to the Embodiments>>

In the one and the another embodiments, a case was discussed where the blur filter is centrally symmetrical, and it was assumed that a blur filter matrix H and the transposed matrix $H^T$ thereof are the same, however, the present invention is not limited thereto. When the blur filter is not centrally symmetrical, the blur filter matrix H and the transposed matrix $H^T$ thereof can be handled as blur filter matrices which are different from each other.

In the one and the another embodiments, it was assumed that the blurred image to be subjected to restore processing had been caused when the imaging lens of an imaging device, such as an electronic camera, had become out of focus, however, the present invention is not limited thereto. For example, the image may be obtained through smoothing processing, or may be obtained through enlargement of a low resolution image by the use of an enlargement factor greater than 1.

In the one and the other embodiments, an enhanced Gauss type filter was used as the blur filter in the restore processing, however, the present invention is not limited thereto. For example, a well type filter or the like may be selected, as necessary, for the processing. Or, it is preferable to use one for which the effects of the point-spread function of an optical system of an actual imaging device are evaluated as a blur filter.

In the one and the other embodiments, the present invention was applied to image processing to restore a blurred image, however, the present invention is not limited thereto. For example, the present invention is applicable to compression and decompression processing of an image. Specifically, in compressing an image, by using a blur filter, the characteristics of which are clear, to perform smoothing processing of the image, it is possible to perform the compression with an extremely high efficiency. By compressing the image data having been subjected to thus smoothing processing, and generating a file added with the information on the used blur filter and statistic parameters m and l, it is possible, at the time of decompression, to perform decompressing of the image having been subjected to the smoothing processing and restore processing. In such a manner, not only it is possible to efficiently compress an image, but also it is possible to transmit and receive the image without a wasteful load on the network.

In the one embodiment, a steepest descent method was used to obtain a clear image f in the restore processing, however, the present invention is not limited thereto. For example, it is possible to select and use a numerical optimization method as necessary, such as a conjugate gradient method, accompanied by no matrix operation.

In the one embodiment, in step S18, determination was made according to whether or not the maximum value of the components of the gradient vector of the cost function $J_B$ obtained by using the updated clear image f was smaller than 1, however, the present invention is not limited thereto. For example, the determination may be made according to whether or not the number of loop counts of image processing is greater than a predetermined value, or the determination may be made using both the maximum value of the components of the gradient vector of the cost function $J_B$ and the number of loop counts.

In the other embodiment, a conjugate gradient method or steepest descent method was used in restore processing to obtain a clear image f, however, the present invention is not limited thereto. It is possible to select and use, as necessary, a numerical optimization method accompanied by no matrix operation.

In the another embodiment, when $\epsilon_i$ could not be obtained in step S26 immediately after a start of processing, the process proceeded directly to step S29 to perform processing by the conjugate gradient method, however, the present invention is not limited thereto. The process may proceed directly to step S28 to perform processing by the steepest descent method.

In the another embodiment, in step S26, $\epsilon_i$ was obtained from the ratio between the absolute values of the gradient vectors of the cost function $J_B$ in accordance with Equation (9), the present invention is not limited thereto. It is allowed to obtain $\epsilon_i$ from the ratio between respective maximum components in the gradient vectors of the cost functions $J_B$ at the current position (i) and the previous position (i−1).

In the another embodiment, in step S31, determination was made according to whether or not the maximum value of the components of the gradient vector of the cost function $J_B$ obtained by using the updated clear image f is smaller than 1, the present invention is not limited thereto. For example, the determination may be made according to whether or not the number of loop counts of the image processing is greater than a predetermined value, or the determination may be made using both the maximum value of the components of the gradient vector of the cost function $J_B$ and the number of loop counts.

The present invention is further applicable to processing of increasing the resolution of a low resolution image. For example, a motion image file picked up by an electronic video camera or the like is produced by reading, with partial skipping, the pixel values of an imaging sensor at a high speed. Accordingly, the image of one frame of the motion image is, in general, with a lower resolution compared with a still image, and the image will be blurred even when the image is enlarged and printed. In this situation, performing restore processing of an image in accordance with the present invention in enlarging the image makes it possible to print the image as a clear image. Further, it is possible to use the restore processing to improve the resolution of an image picked up by a security camera or the like.

In addition, the present invention is applicable to an image processing apparatus, the apparatus having a program for realizing respective processes in an image processing method in accordance with the present invention, that restores a blurred image to a clear image or increases the resolution of a low resolution image.

In addition, the present invention is applicable to making a computer functional as an image processing apparatus, the apparatus having a program for realizing respective processes in an image processing method in accordance with the present invention, that restores a blurred image to a clear image or increases the resolution of a low resolution image.

In addition, the present invention is applicable to a recording medium that stores a computer program for realizing respective processes in an image processing method in accordance with the present invention.

The present invention can be practiced in other various forms without departing from the gist or major features thereof. Accordingly, the foregoing embodiments are no more than mere examples in all respects, and should not be limited in interpretation. Further, all changes and modifications belonging to a scope equivalent to the scope of the claims are within the scope of the present invention.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing method of obtaining a clear image from a blurred image, comprising:
   converting an array of image data from a two dimension into a one-dimensional vector, the image data storing pixel values of the blurred image;
   converting all of two-dimensional matrix operations acting on the one-dimensional vector into an image filtering for the image data of the blurred image, and calculating values of statistic parameters necessary for calculation of a cost function estimating the clear image and a first gradient vector of the cost function;
   updating, by using the first gradient vector being calculated, image data of the clear image by one of a first numerical optimization method and a second numerical optimization method which calculates the image data of the clear image by using only a gradient vector such that a value of the cost function becomes maximum or minimum;
   calculating a second gradient vector of the cost function obtained from the image data of the clear image being updated; and
   selecting one of the first numerical optimization method and the second numerical optimization method according to a comparison of a value of a ratio with a predetermined value, the ratio being between a size of the first gradient vector and a size of the second gradient vector.

2. The image processing method according to claim 1, wherein
   the first numerical optimization method is a steepest descent method.

3. The image processing method according to claim 1, wherein
   the second numerical optimization method is a conjugate gradient method.

4. An image processing method of obtaining a clear image from a blurred image, comprising:
   converting an array of image data from a two dimension into a one-dimensional vector, the image data storing pixel values of the blurred image;
   converting all of two-dimensional matrix operations acting on the one-dimensional vector into an image filtering for the image data of the blurred image, and calculating values of statistic parameters necessary for calculation of a cost function estimating the clear image and a first gradient vector of the cost function;
   updating, by using the first gradient vector being calculated, image data of the clear image by one of a first numerical optimization method and a second numerical optimization method which calculates the image data of the clear image by using only a gradient vector such that a value of the cost function becomes maximum or minimum;
   calculating a second gradient vector of the cost function obtained from the image data of the clear image being updated; and
   selecting one of the first numerical optimization method and the second numerical optimization method according to a comparison of a value of a ratio with a predetermined value, the ratio being between a maximum value of components of the first gradient vector and a maximum value of components of the second gradient vector.

5. An image processing method of obtaining a clear image from a blurred image, comprising:
   converting an array of image data from a two dimension into a one-dimensional vector, the image data storing pixel values of the blurred image;
   converting all of two-dimensional matrix operations acting on the one-dimensional vector into an image filtering for the image data of the blurred image, and calculating values of statistic parameters necessary for calculation of a cost function estimating the clear image and a first gradient vector of the cost function;
   updating, by using the first gradient vector being calculated, image data of the clear image by one of a first numerical optimization method and a second numerical optimization method which calculates the image data of the clear image by using only a gradient vector such that a value of the cost function becomes maximum or minimum;

calculating a second gradient vector of the cost function obtained from the image data of the clear image being updated; and selecting one of the first numerical optimization method and the second numerical optimization method according to a comparison of a value of a ratio with a predetermined value, the ratio being between a size of the first gradient vector and a size of the second gradient vector in which the second numerical optimization method adjusts the second gradient vector using the first gradient vector.

6. An image processing method of obtaining a clear image from a blurred image, comprising:

converting an array of image data from a two dimension into a one-dimensional vector, the image data storing pixel values of the blurred image;

converting all of two-dimensional matrix operations acting on the one-dimensional vector into an image filtering for the image data of the blurred image, and calculating values of statistic parameters necessary for calculation of a cost function estimating the clear image and a first gradient vector of the cost function;

updating, by using the first gradient vector being calculated, image data of the clear image by one of a first numerical optimization method and a second numerical optimization method which calculates the image data of the clear image by using only a gradient vector such that a value of the cost function becomes maximum or minimum;

calculating a second gradient vector of the cost function obtained from the image data of the clear image being updated; and selecting one of the first numerical optimization method and the second numerical optimization method according to a comparison of a value of a ratio with a predetermined value, the ratio being between a maximum value of components of the first gradient vector and a maximum value of components of the second gradient vector in which the second numerical optimization method adjusts the second gradient vector using the first gradient vector.

* * * * *